United States Patent Office 3,634,404
Patented Jan. 11, 1972

3,634,404
7α,8α-METHYLENEESTROGENS AND
PREPARATION THEREOF
David J. Marshall, Hampstead, Quebec, Canada, assignor to American Home Products Corporation, New York, N.Y.
No Drawing. Filed May 8, 1969, Ser. No. 823,141
Int. Cl. C07c 173/00
U.S. Cl. 260—239.55          14 Claims

ABSTRACT OF THE DISCLOSURE

There are disclosed herein 7α,8α-methyleneestrogens of the general Formula I

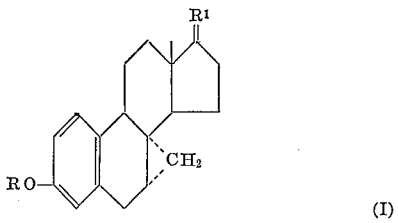

in which R represents hydrogen, a lower alkyl group containing from 1–8 carbon atoms, a cycloalkyl group containing from 5–7 carbon atoms, the 2-tetrahydropyranyl group, a lower aliphatic acyl group containing from 2–4 carbon atoms, the benzoyl, hexahydrobenzoyl, hemisuccinyl, or cyclopentylpropionyl group, or the group X+SO₃— in which X+ represents the sodium, potassium or ammonium ion or a protonated organic base; R¹ represents O (ketonic oxygen) or the group

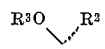

in which R² represents hydrogen, a lower alkyl group containing from 1–4 carbon atoms, a lower alkenyl group containing from 2–4 carbon atoms, a lower alkynyl group containing from 2–4 carbon atoms, a lower dialkynyl group containing from 4–8 carbon atoms, the 2-furyl, 3-furyl, 2-thienyl or 3-thienyl group and R³ represents hydrogen or a lower aliphatic acyl group containing from 2–4 carbon atoms.

There are also disclosed processes for preparing the compounds of this invention from equilin or 17β-dihydroequilin by treatment with triethylaluminum and methylene iodide in a hydrocarbon-type solvent to obtain 7α,8α-methyleneestra-1,3,5(10)-triene-3,17β-diol, and for conversion of the latter compound to the other compounds of Formula I.

The compound of Formula I are powerful estrogens, and methods for their use are also disclosed.

The present invention relates to 7α,8α-methyleneestrogens of the general Formula I

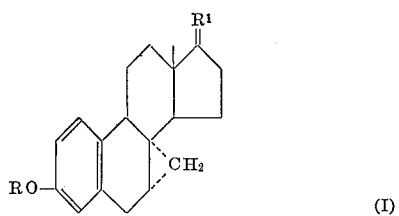

in which R represents hydrogen, a lower alkyl group containing from 1–8 carbon atoms, a cycloalkyl group containing from 5–7 carbon atoms, the 2-tetrahydropyranyl group, a lower aliphatic acyl group containing from 2–4 carbon atoms, the benzoyl, hexahydrobenzoyl, hemisuccinyl, or cyclopentylpropionyl group, or the group X+SO₃— in which X+ represent the sodium, potassium or ammonium ion or a protonated organic base; R¹ represents O (ketonic oxygen) or the group

in which R² represents hydrogen, a loweralkyl group containing from 1–4 carbon atoms, a lower alkenyl group containing from 2–4 carbon atoms, a lower alkynyl group containing from 2–4 carbon atoms, a lower dialkynyl group containing from 4–8 carbon atoms, the 2-furyl, 3-furyl, 2-thienyl or 3-thienyl group and R³ represents hydrogen or a lower aliphatic acyl group containing from 2–4 carbon atoms.

The 7α,8α-methyleneestrogens of this invention have estrogenic activity and are more powerful than the parent compounds without the 7α,8α-methylene group from which they are formally derived. More particularly, these compounds, in standard pharmacological tests, for example, in the procedure commonly known as the Allen-Doisy test described by the authors in J. Am. Med. Ass. Vol. 81, p. 819 (1923) have exhibited utility as estrogens.

When the 7α,8α-methyleneestrogens of this invention are employed as estrogens in warm-blooded animals, for example in rats, alone or in combination with pharmacologically acceptable carriers the proportion of the former is determined by their solubility and by the chemical nature of the compound, by the chosen route of administration, and by standard biological practice. For example, the 7α,8α-methyleneestrogens of this invention may be administered orally in solid form containing such excipients as starch, lactose, certain types of clay, as well as lubricating and/or coating agents. They may also be administered orally in liquid form or they may be injected parenterally, both in aqueous solutions. Such solutions, especially those for parenteral administration, may also contain other solutes such as, for example sodium chloride, sodium citrate, or glucose to make the solution isotonic. Alternatively, the 7α,8α-methyleneestrogens of this invention may be administered parenterally in the form of sterile solutions in vegetable oils.

The dosage of the 7α,8α-methyleneestrogens of this invention will vary with the form of administration and the particular compound chosen. Furthermore, it will vary with the particular host under treatment. Generally, treatment is initiated with small dosages substantially less than the optimum dose of the compound. Thereafter the dosage is increased by small increments until the optimum form under the circumstances is reached. In general, the compounds of this invention are most desirably administered at a concentration level that will generally afford effective results without causing any harmful or deleterious side effects and preferably at a level in the range of from about 0.1 mcg. to about 100 mcg./kg. per day, although as aforementioned, variations will occur. However, a dosage level in the range of from about 0.3 mcg. to 30 mcg./kg. per day is most desirably employed in order to achieve effective results.

I prefer to prepare the 7α,8α-methyleneestrogens of this invention by the following reaction.

Equilin (II) or 17β-dihydroequilin (III) is treated in solution in a hydrocarbon-type solvent such as, for example, hexane, cyclo-hexane, benzene, toluene, or xylene with triethylaluminum and methylene iodide at temperatures within the range of from 25° C. to 140° C. The preferred solvent is benzene and the preferred temperature is about 80° C. By the use of this reaction, which is novel in the steroid field, there is obtained 7α,8α-methyleneestra-1,3,5,(10)-triene-3,17β-diol (IV) in good yields.

It will be obvious to those skilled in the art that said last-named compound may be transformed in a number of ways such as, for example, by acylation, etherification, or by reaction of organo-metallic compounds with the corresponding 17-ketone. The order of such reaction steps may in some cases be varied as a matter of convenience.

For example, the diol may be etherified at carbon atom 3 to yield the compounds of Formula I in which R represents a lower alkyl group, a cycloalkyl group, or the 2-tetrahydropyranyl group as defined above, or may be acylated at carbon atom 3 or at carbon atoms 3 and 17, to yield the compounds of Formula I in which R represents an acyl group and $R^1$ represents the group

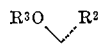

in which $R^2$ represents hydrogen and $R^3$ represents hydrogen or an acyl group. The hydroxyl group at carbon atom 17 may be oxidized to the corresponding 17-ketone, either with or without prior etherification at carbon atom 3, to yield the compounds of Formula I in which R represents hydrogen, a lower alkyl group, a cycloalkyl group or the 2-tetrahydropyranyl group as defined above, and $R^1$ represents O (ketonic oxygen). The resulting 17-keto derivative may be reacted with organometallic compounds such as, for example, methyllithium, potassium, sodium or lithium acetylide, 2-furyllithium, 3-furyllithium or 2-thienyllithium, 3-thienyllithium or a Grignard reagent, such as, for example, methyl or ethyl magnesium bromide, vinyl magnesium bromide, or ethynyl magnesium bromide in an inert solvent such as, for example, ether, benzene, toluene, tetrahydrofuran, or any mixture thereof at temperatures between room temperature and the reflux temperature of the respective solvent or solvent mixture, to yield the corresponding 17α-substituted compounds of Formula I, in which R represents hydrogen, a lower alkyl group or a cycloalkyl group or the tetrahydropyranyl group as defined above, and $R^1$ represents the group

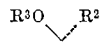

in which $R^2$ is as defined in Formula, I, except that it may not be hydrogen, and $R^3$ represents hydrogen.

The 17α-dialkynyl derivatives are prepared from the corresponding 17α-ethynyl derivatives according to the methods described by Burgess et al. in Tetrahedron, vol. 23, p. 4111 (1967) and in Dutch Pat. 6701688.

The 17α-ethynyl derivatives of this invention are useful as intermediates for the preparation of their corresponding 17α-vinyl and 17α-ethyl derivatives.

For example, 17α-ethynyl-3-methoxy-7α,8α-methylene-estra-1,3,5(10)-trien-17-ol, is preferentially hydrogenated in the presence of Lindlar catalyst [H. Lindlar, Helv. Chem. Acta., 35, 446 (1952)], and hydrogen to yield 3-methoxy - 7α,8α-methylene-17α-vinylestra-1,3,5(10)-trien-17-ol.

Said last-named compound or the 17α-ethyl compound can also be hydrogenated in the presence of palladium on charcoal to yield 17α-ethyl-3-methoxy-7α,8α-methylene-estra-1,3,5(10)-trien-17-ol.

When preparing the products of this invention of Formula I where R represents hydrogen and $R^1$ represents the group

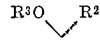

in which $R^3$ and $R^2$ are as defined above, we prefer to use 7α,8α - methylene - 3-tetrahydropyranyloxyestra-1,3,5 (10)-trien-17-one as starting material. The 17-substituted-7α,8α - methylene - 3 - tetrahydropyranyloxyestra-1,3,5, (10)-trien-17-ol is then prepared by the method described above, and subsequent removal of the tetrahydropyranyl group by treatment with a dilute mineral acid gives the products of Formula I where R represents hydrogen. These latter products are useful as intermediates for alternate preparation of their corresponding 3-alkyl and 3-cycloalkyl ethers; when utilized for this purpose they are treated according to the method used to synthesize the known ethers of estrone [F. Glockling and D. Kingston, Chim. and Ind. 1037 (1961)].

Esterification of the free phenolic hydroxyl in position 3 is achieved by conventional means with acid anhydrides and acid chlorides in pyridine at room temperature to yield the corresponding 3-acyl derivatives. In order to achieve esterification of the tertiary hydroxyl group on position 17 more drastic conditions are required, such as the use of mixtures of acid anhydrides and acid chlorides in pyridine at temperature between room temperature and 100° C. for extended periods of time, as for example, 1 to 5 days; the corresponding 17-acyl derivatives are thus obtained. If a free phenolic hydroxyl group should also be present in the molecule it will also be esterified under those conditions.

The resulting 3,17-diacyl derivative can be preferentially hydrolyzed to the corresponding 17-acyl-3-hydroxy derivative by means of a base such as sodium or potassium carbonate or sodium or potassium bicarbonate.

For the preparation of the sulfate esters, the respective diols, or preferably the 17-acyl-3-hydroxy derivatives which are less susceptible to dehydration under the conditions of the following reaction are treated with chlorosulfonic acid in the presence of a suitable organic base such as, for example, pyridine or dimethylaniline in an inert solvent. The base salt of the resulting sulfate ester may be purified by conversion to a suitable insoluble salt, such as, for example, to the quinidine salt, which may be purified by washing or by crystallization; or to the ammonium salt which may be purified by extraction with a suitable solvent such as, for example, n-butanol. The resulting quindine or ammonium salt may be converted to other base salts such as, for example, the sodium or potassium salts by treatment with the appropriate free base.

Subsequent hydrolysis of the 17β-acylated derivative to the corresponding 17β-hydroxy compounds is effected by treatment with aqueous sodium or potassium hydroxide.

The following formulae, in which R and $R^1$ have the significance defined above, and examples will illustrate this invention.

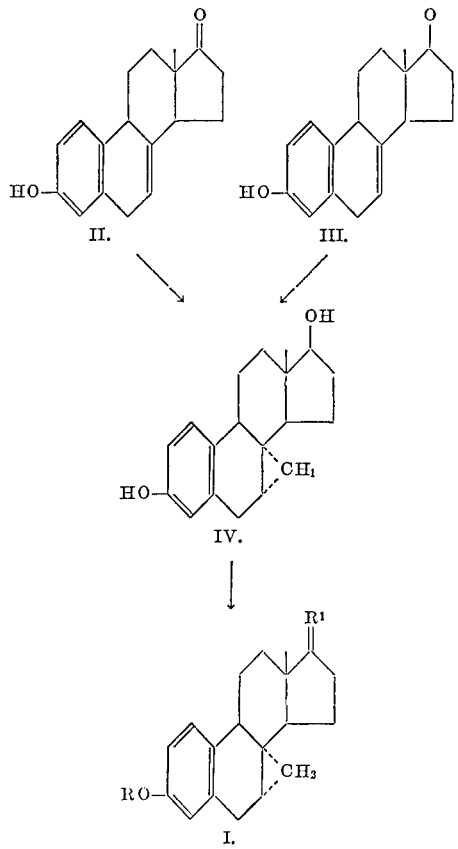

EXAMPLE 1

7α,8α-methyleneestra-1,3,5(10)-triene-3,17β-diol

A 20% solution of triethylaluminum in hexane (494 ml.) is drained directly from a cylinder (Texas Alkyls, Inc.) into a nitrogen-flushed three-necked flask. After dilution with 300 ml. of benzene, 36.0 g. of equilin is added in small portions with stirring. To the resulting solution, a solution of 52 ml. (169 g.) of redistilled methylene iodide in 70 ml. of benzene is added dropwise and the mixture is stirred and heated under reflux for 24 hours. To the ice-cooled solution, 110 ml. of methanol is added dropwise, followed by 100 ml. of water, and the mixture is extracted with ethyl acetate after acidification with 10% hydrochloric acid. The extract is washed with dilute sodium thiosulfate and sodium bicarbonate solutions and with water. The yellow oil remaining after drying and removal of solvent crystallizes from acetone-hexane to yield the title compound as a colorless solid with M.P. 182–184°; $[\alpha]_D^{25}$+165° (dioxane); $\lambda_{max}$ 280 mμ (ε 2090).

*Analysis.*—Calcd. for $C_{19}H_{24}O_2$ (percent): C, 80.24; H, 8.51. Found (percent): C, 80.02; H, 8.52.

In the manner, but using 17β-dihydroequilin instead of equilin as the starting material, the title compound is also obtained.

EXAMPLE 2

7α-8α-methyleneestra-1,3,5(10)-triene-3,17β-diol diacetate

7α,8α-methyleneestra - 1,3,5(10) - triene - 3,17β - diol, obtained as described in Example 1, is acetylated with acetic anhydride in pyridine at room temperature overnight. The title compound crystallizes from methylene chloride-methanol with M.P. 175–176° C.; $[\alpha]_D^{25}$+112° (dioxane).

*Analysis.*—Calcd. for $C_{23}H_{28}O_4$ (percent): C, 14.97; H, 7.66. Found (percent): C, 74.76; H, 7.91.

EXAMPLE 3

3-methoxy-7α,8α-methyleneestra-1,3,5(10)-trien-17β-ol

To a vigorously stirred solution of 18.0 g. of 7α,8α-methyleneestra-1,3,5(10)-triene - 3,17β - diol, obtained as described in Example 1, in 200 ml. of ethanol and 340 ml. of 2 N sodium hydroxide maintained at 20° C. is added 35 ml. of dimethyl sulfate followed by an additional 35 ml. after 15 minutes. After a further 15 minutes, 160 ml. of 2 N sodium hydroxide and 35 ml. of dimethyl sulfate are added. After stirring for 30 minutes longer, the suspension is filtered and washed first with dilute sodium hydroxide and then with water, to yield the title compound with M.P. 108–110° C. after crystallization from methanol.

In the same manner, by using ethyl bromide or ethyl iodide, or cyclopentyl bromide instead of dimethyl sulfate, 3-ethoxy-7α,8α-methyleneestra-1,3,5(10)-trien-17β-ol and 3-cyclopentyloxy - 7α,8α - methyleneestra - 1,3,5(10)-trien-17β-ol are respectively obtained.

EXAMPLE 4

3-hydroxy-7α,8α-methyleneestra-1,3,5(10)-trien-17-one

To a solution of 5.00 g. of 7α,8α-methyleneestra-1,3,5(10)-triene-3,17β-diol, obtained as described in Example 1, in 50 ml. of dimethyl sulfoxide and 11 ml. of triethylamine cooled to 15° is added dropwise a solution of 7.8 g. of triethylaminesulfur trioxide complex, prepared from triethylamine and chlorosulfonic acid, in 25 ml. of dimethyl sulfoxide. After stirring for 0.5 hour, 35 ml. of 10% hydrochloric acid is added dropwise with cooling, followed by 150 ml. of water. The resulting sticky precipitate is dissolved in ether, and the ether solution is washed with water, dried, and evaporated. Crystallization from methylene chloride-methanol yields the title compound with M.P. 218–219° C., $[\alpha]_D^{25}$+249° (dioxane.)

*Analysis.*—Calcd, for $C_{19}H_{22}O_2$ (percent): C, 80.82; H, 7.85. Found (percent): C, 80.58; H, 7.72.

EXAMPLE 5

17α-ethynyl-7α,8α-methyleneestra-1,3,5(10)-triene-3,17-diol

To an ice-cooled solution of 2.90 g. of 3-hydroxy-7α,8α-methyleneestra-1,3,5(10)-trien-17-one, obtained as described in Example 4, in 45 ml. of tetrahydrofuran is added 15 ml. of a 20% suspension of sodium acetylide in dimethyl sulfoxide (prepared from 20% sodium acetylide in xylene by centrifuging and washing with tetrahydrofuran followed by re-suspension in dimethyl sulfoxide). The stirred mixture is allowed to come to room temperature and an additional 30 ml. of dimethyl sulfoxide is added in order to dissolve precipitated material. After stirring overnight, the solution is decanted from the precipitated solid and discarded. The residue is suspended in 30 ml. of tetrahydrofuran, and water followed by 10% hydrochloric acid is added with ice cooling. Extraction with ether gives a pale yellow foam which is chromatographed on magnesium silicate (Florisil). Elution with benzene containing 5–10% ether gives a colorless foam which crystallizes from acetone-hexane to yield the title compound with M.P. 181–183° C. The mother liquors contain the title compound and starting material, and are treated with Girard reagent, and separation followed by crystallization yields additional quantities of the title compound with M.P. 180–183°. Those are combined and crystallized from acetone-hexane in another modification with M.P. 218–219° C. $[\alpha]_D^{25}$+137° (dioxane).

*Analysis.*—Calcd. for $C_{21}H_{24}O_2$ (percent): C, 81.78; H, 7.84. Found (percent): C, 82.00; H, 7.84.

In the same manner, when using as starting materials the 3-methyl, 3-ethyl, or 3-cyclopentyl ethers of 3-hydroxy - 7α,8α - methyleneestra - 1,3,5(10) - trien-17-one, obtained as described in Example 4, there are obtained 17α-ethynyl-3-methoxy-7α,8α-methyleneestra-1,3,5(10)-trien-17-ol,
17α-ethyl-3-ethoxy-7α,8α-methyleneestra-1,3,5(10)-trien-17-ol, and
17α-ethynyl-3-cyclopentyloxy-7α,8α-methyleneestra-1,3,5(10)-trien-17-ol, respectively.

EXAMPLE 6

7α,8α-methylene-17α-vinylestra-1,3,5(10)-triene-3,17-diol

A solution of 17α-ethynyl-7α,8α-methyleneestra-1,3,5(10)-triene-3,17-diol (5.0 g.), obtained as described in Example 5 in dioxane (90 ml.), and pyridine (10 ml.), is stirred under hydrogen at atmospheric conditions in the presence of 5% palladium on calcium carbonate (1.0 g.), until one equivalent of hydrogen is absorbed. The catalyst is removed by filtration and the filtrate concentrated to yield 7α,8α - methylene - 17α - vinylestra - 1,3,5(10)-triene-3,17-diol, $\gamma_{max}$: 3220, 1630 cm.$^{-1}$.

Similarly there are obtained.

3-methoxy-7α,8α-methylene-17α-vinylestra-1,3,5(10)-trien-17-ol,
3-ethoxy-7α,8α-methylene-17α-vinylestra-1,3,5(10)-trien-17-ol, and
3-cyclopentyloxy-7α,8α-methylene-17α-vinylestra-1,3,5(10)-trien-17-ol, when the respective ether analogs of 17α-ethynyl-7α,8α-methyleneestra-1,3,5(10)-triene-3,17-diol are treated in the same manner.

EXAMPLE 7

17α-ethyl-7α,8α-methyleneestra-1,3,5(10)-triene-3,17-diol

A solution of 17α - ethynyl - 7α,8α-methyleneestra-1,3,5(10)-triene-3,17-diol (5.0 g.), in ethyl alcohol (100 ml.) is treated with hydrogen at atmospheric pressure in the presence of 5% palladium on charcoal (0.5 g.), at room temperature. After two equivalents of hydrogen have been absorbed the catalyst is collected and the filtrate is concentrated to yield 17α-ethyl-7α,8α-methyleneestra-1,3,5(10-trien-3,17-diol.

Similarly, there are obtained

17α-ethyl-3-methoxy-7α,8α-methyleneestra-1,3,5(10)-trien-17-ol,
3-ethoxy-17α-ethyl-7α,8α-methyleneestra-1,3,5(10)-trien-17-ol, and
3-cyclopentyloxy-17α-ethyl-7α,8α-methylene-estra-1,3,5(10)-triene-17-ol, when the respective ether analogs of 17α-ethynyl-7α,8α-methyleneestra-1,3,5(10)- triene-3,17-diol are treated in the same manner.

In the same manner, when using as starting material 7α,8α - methylene - 17α - vinylestra - 1,3,5(10) - triene-3,17 - diol, obtained as described in Example 6, and allowing the uptake of one equivalent of hydrogen, the title compound is also obtained.

EXAMPLE 8

3-methoxy-7α,8α-methyleneestra-1,3,5(10)-trien-17-one

Employing the procedure described in Example 4, but using as starting material 3-methoxy-7α,8α-methyleneestra-1,3,5(10)-trien-17β-ol, obtained as described in Example 3, the title compound is obtained, after crystallization from acetone-hexane, with M.P. 110–113° C., $[\alpha]_D^{25}+239°$ (dioxane).

*Analysis.*—Calcd. for $C_{20}H_{24}O_2$ (percent): C, 81.04; H, 8.16. Found (percent): C, 81.14; H, 7.81.

In the same manner, but using as starting materials 3 - ethoxy - 7α,8α - methyleneestra-1,3,5(10)trien-17β-ol or 3 - cyclopentyloxy - 7α,8α - methyleneestra - 1,3,5(10)-trien-17β-ol, both obtained as described in Example 3, there are obtained 3-ethoxy-7α,8α-methyleneestra-1,3,5(10)-trien-17-one and 3-cyclopentyloxy-1,3,5(10)-trien-17-one, respectively.

EXAMPLE 9

3-(2-tetrahydropyranyloxy)-7α,8α-methyleneestra-1,3,5(10)-trien-17-one

To a stirred suspension of 14.0 g. of 3-hydroxy-7α,8α-methyleneestra-1,3,5(10)-trien-17-one in 42 ml. of dry tetrahydrofuran and 42 ml. of 2,3-dihydropyran in a cold water bath at about 10° is added 3 drops of phosphorus oxychloride. After stirring for 4 hours, the solution is added to 20 ml. of 1% aqueous sodium hydroxide containing ice and the product is extracted with methylene chloride. After washing with water, drying and removal of solvent, the crude product is purified by dissolving in benzene and filtering through a small column of basic alumina followed by crystallization from ether. The title compound is obtained with M.P. 102–112° C.

EXAMPLE 10

17α-(2-furyl)-7α,8α-methyleneestra-1,3,5(10)-triene-3,17-diol

To a stirred, ice-cooled solution of 4.08 g. of furan in 60 ml. of ether kept under a nitrogen atmosphere is added 22 ml. of a 1.7 M solution of n-butyllithium in ether. After stirring at room temperature for 1 hour, 4.00 g. of 3-(2-tetrahydropyranyloxy)-7α,8α-methyleneestra-1,3,5(10)-trien-17-one, obtained as described in Example 9, is added, and the mixture is stirred for 18 hours. Water is then added to the ice-cooled mixture and the product is extracted with ether-ethyl acetate 3:1. 17α - (2' - furyl) - 7α,8α - methyleneestra - 1,3,5(10)-triene-3,17-diol 3-(2-tetrahydropyranyl) ether, obtained as a viscous oil after washing with water, drying, and removal of solvent is dissolved in 470 ml. of 0.036% hydrochloric acid in 87.3% ethanol. After standing for 4.5 hours, 6 ml. of saturated aqueous sodium bicarbonate solution is added, and the solution is concentrated to dryness. Crystallization from isopropanol with charcoal treatment yields the title compound with M.P. 181–183° C.

*Analysis.*—Calcd. for $C_{23}H_{28}O_3$ (percent): C, 78.32; H, 7.48. Found (percent): C, 79.03, H, 7.56.

In the same manner, but using freshly distilled thiophene instead of furan, there is obtained 17α-(2'-thienyl)-3-(2-tetrahydropyranyl)oxy - 7α,8α - methyleneestra-1,3,5(10)-trien-17-ol, and, after treatment with acid as described above, 17α(2'-thienyl) - 7α,8α - methyleneestra-1,3,5(10)-triene-3,17-diol.

Again in the same manner, but using as starting materials the 3-methyl, 3-ethyl, or 3-cyclopentyl ethers of 3-hydroxy - 7α,8α - methylenestra - 1,3,5(10) - trien-17-one and furan or thiophene, but omitting the treatment with acid, there are obtained:

17α-(2'-furyl)-3-methoxy-7α,8α-methyleneestra-1,3,5(19)-trien-17-ol,
17α-(2'-furyl)-3-ethoxy-7α,8α-methyleneestra-1,3,5(10)-1,3,5(10)-trien-17-ol,
17α-(2'-furyl)-3-cyclopentyloxy-7α,8α-methyleneestra-1,3,5(10)-trien-17-ol,
17α-(2'-thienyl)-3-methoxy-7α,8α-methyleneestra-1,3,5(10)-trien-17-ol,
17α-(2'-thienyl)-3-ethoxy-7α,8α-methyleneestra-1,3,5(10)-trien-17-ol, and
17α-(2'-thienyl)-3-cyclopentyloxy-7α,8α-methyleneestra-1,3,5(10)-trien-17-ol, respectively.

EXAMPLE 11

17α - [3' - furyl]-3-(2-tetrahydropyranyl)oxy-7α,8α-methyleneestra-1,3,5(10)-trien-17-ol A solution of 3-iodofuran (25 g.), ether (500 ml.), and a 1.52 N ethereal solution of n-butyllithium (73.5 ml.), is stirred at —60° C. for 30 minutes. Then a solution of 3 - (2 - tetrahydropyranyl)oxy-7α,8α-methyleneestra-1,3,5 (10)-trien-17-one (25 g.), described in Example 9, in toluene (1000 ml.), is added. After stirring the mixture for 16 hours at room temperature the solution is diluted with ether, washed with water, dried and evaporated to dryness to yield 17α-[3'-furyl]-3-(2-tetrahydropyranyl)oxy-7α,8α-methyleneestra-1,3,5(10)-trien-17-ol.

In the same manner, by using as starting materials the 3-methyl, 3-ethyl, or 2-cyclopentyl ethers of 3-hydroxy-7α,8α-methyleneestra-1,3,5(10)-trien-17-one, described in Example 8, there are obtained 17α-(3'-furyl)-3-methoxy-7α,8α-methyleneestra-1,3,5(10)-trien-17-ol,
17α-(3'furyl)-3-ethoxy-7α,8α-methyleneestra-1,3,5(10)-trien 17-ol and,
17α-(3'-furyl)-3-cyclopentyloxy-7α,8α-methyleneestra-1,3,5(10)-trien-17-ol, respectively.

Again in the same manner, but using as starting materials 3-thienyllithium, prepared according to the procedure of S. Gronowitz, Arkiv. for Kemi, vol. 7, p. 361 (1954) and the ethers of 3-hydroxy-7α,8α-methyleneestra-1,3,5 (10)-trien-17-one described in Examples 8 and 9 there are obtained 17α-(3'-thienyl)-3-methoxy-7α,8α-methyleneestra-1,3,5(10)-trien-17-ol,
17α-(3'-thienyl)-3-ethoxy-7α,8α-methyleneestra-1,3,5(10)-trien-17-ol,
17α-(3'-thienyl)-3-cyclopentyloxy-7α,8α-methyleneestra-1,3,5(10)-trien-17-ol, and,
17α-(3'-thienyl)-3-(2-tetrahydropyranyl)oxy-7α,8α-methyleneestra-1,3,5(10)-trien-17-ol, respectively.

Treatment of the 3-(2-tetrahydropyranyl)-ethers described above with acid in the manner described in Example 10 yields 17α-(3'-furyl)-7α,8α-methyleneestra-1,3,5 (10)-triene-3,17-diol and 17α-(3'-thienyl)-7α,8α-methyleneestra-1,3,5(10)-triene-3,17-diol, respectively.

EXAMPLE 12

3 - methoxy - 17α-methyl-7α,8α-methyleneestra-1,3,5(10)-trien-17-ol

A mixture of 3-methoxy-7α,8α-methyleneestra-1,3,5(10)-trien-17-one (5 g.), tetrahydrofuran (125 ml.), and a 3 N ethereal solution of methyl magnesium bromide (60 ml.) is refluxed overnight. The mixture is cooled to 0° C. and the complexes are decomposed with a saturated ammonium chloride solution. Ether and dilute sulfuric acid are added. The ether layer is then washed with sodium bicarbonate and water, dried and evaporated. 3-methoxy-17α - methyl - 7α,8α-methyleneestra-1,3,5(10)-trien-17-ol purified by chromatography on alumina.

Similarly, there are obtained:

17α-methyl-7α,8α-methyleneestra-1,3,5(10)-trien-3,17-diol, 3-ethoxy-17α-methyl-7α,8α-methyleneestra-1,3,5(10)-trien-17-ol, 3-cyclopentyloxy-17α-methyl-7α,8α-methyleneestra-1,3,5(10)-trien-17-ol, and, 17α-methyl-3-(2-tetrahydropyranyl)oxy-7α,8α-methyleneestra-1,3,5(10)-trien-17-ol, when 3-hydroxy-7α,8α-methyleneestra-1,3,5(10)-trien-17-one or the respective ethers of 7α,8α-methyleneestra-1,3,5(10)-triene-3,17β-diol are treated with methyllithium or methylmagnesium bromide.

By a similar procedure, but replacing methylmagnesium bromide with ethylmagnesium bromide, 3-hydroxy-7α,8α-methyleneestra-1,3,5(10)-trien-17-one and its 3-alkyl ethers are transformed into the corresponding 17α-ethyl-17β-hydroxy derivatives such as:

17α-ethyl-7α,8α-methyleneestra-1,3,5(10)-triene-3,17-diol, 3-methoxy-17α-ethyl-7α,8α-methyleneestra-1,3,5(10)-trien-17-ol, 3-ethoxy-17α-ethyl-7α,8α-methyleneestra-1,3,5(10)-trien-17-ol.

3-cyclopentyloxy-17α-ethyl-7α,8α-methyleneestra-1,3,5(10)-trien-17-ol, and

17α-ethyl-3-(2-tetrahydropyranyl)oxy-7α,8α-methyleneestra-1,3,5(10)-trien-17-ol, respectively.

EXAMPLE 13

3 - cyclopentyloxy - 17α-(3'-furyl)-7α,8α-methyleneestra-1,3,5(10)-trien-17-ol

A mixture of 17α-(3'-furyl)-7α,8α-methyleneestra-1,3,5(10)-triene-3,17-diol, (5 g.), obtained in Example 11, ethanol (99%) (100 ml.), potassium carbonate (10 g.), and bromocyclopentane (10 g.), is refluxed for 90 minutes. Additional quantities of potassium carbonate (5 g.), and bromocyclopentane (5 g.) are added and the heating is continued for 90 minutes. After cooling the mixture, the solid is filtered and washed with ethanol, and the filtrate is diluted with ether and methylene chloride. The organic solutions are washed with Claisen's alkali and water. After drying and evaporating the solvents, the residue is chromatographed on alumina, the fractions eluted with mixture of benzene and hexane are combined and crystallized from acetone-hexane to yield the 3-cyclopentyloxy-17α-(3'-furyl)-7α,8α-methyleneestra-1,3,5(10)-trien-17-ol.

In the same manner, by using dimethyl sulfate or ethyl bromide and sodium hydroxide instead of bromocyclopentane, and potassium carbonate there are obtained 17α-(3' - furyl)-3-methoxy-7α,8α-methyleneestra-1,3,5(10)-trien-17-ol and 3-ethoxy-17α-(3'-furyl)-7α,8α-methyleneestra-1,3,5(10)-trien-17-ol, respectively.

In the same manner, but using as starting materials dimethyl sulfate, ethyl bromide or bromocyclopentane and 17α-(2'-furyl)-, 17α-(2'-thienyl)-, 17α-(3'-thienyl)-, 17α-methyl-, 17α-ethyl-, 17α-ethylnyl-, or 17α-vinyl-7α,8α-methyleneestra-1,3,5(10)-triene-3,17-diol, the respective 3-methyl, 3-ethyl, and 3-cyclopentyl ethers of the above compounds are also obtained.

EXAMPLE 14

3 - acylates of 17α-substituted - 7α,8α - methyleneestra-1,3,5(10)-triene-3,17-diols A solution of 17α-(3'-furyl) - 7α,8α - methyleneestra-1,3,5(10)-triene-3,17-diol, (5 g.), obtained as described in Example 11, in pyridine (50 ml.), and acetic anhydride (50 ml.), is stirred at room temperature for 2½ hours. The solution is diluted with ice-water and is extracted with ether. The ether is washed with dilute sulfuric acid, water, sodium bicarbonate, and water, again to neutrality. The solution is dried and evaporated to yield 3-acetoxy-7α,8-epoxy-17α-[3'-furyl]-estra-1,3,5(10)-trien-17-ol.

Similarly acetylation with acetic anhydride in pyridine solutions of the other 17α - substituted 7α,8-epoxyestra-1,3,5(10)-triene-3,17-diol, obtained as described in Examples 5, 6, 7, 10, 11 and 12 yields respectively:

3-acetoxy-17α-[2'-furyl]-7α,8α-methyleneestra-1,3,5(10)-triene-17-ol, 3-acetoxy-17α-[2'-thienyl]-7α,8α-methyleneestra-1,3,5(10)-triene-17-ol, 3-acetoxy-17α-[3'-thienyl]-7α,8α-methyleneestra-1,3,5(10)-triene-17-ol, 3-acetoxy-17α-methyl-7α,8α-methyleneestra-1,3,5(10)-triene-17-ol, 3-acetoxy-17α-ethyl-7α,8α-methyleneestra-1,3,5(10)-triene-17-ol, 3-acetoxy-17α-vinyl-7α,8α-methyleneestra-1,3,5(10)-triene-17-ol, and 3-acetoxy-17α-ethynyl-7α,8α-methyleneestra-1,3,5(10)-trien-17-ol.

By substituting for acetic anhydride in the above procedure propionic, butyric, or succinic anhydrides or benzoyl chlorides, hexahydrobenzoyl chloride or cyclopentylpropionyl chloride the corresponding 3-propionates, 3-butyrates, 3 - hemisuccinates, 3-benzoates, 3-hexahydrobenzoates, 3-cyclopentylpropionates of 17α-(3'-furyl)-7α,8α-methyleneestra-1,3,5(10)-triene-3,17-diol, 17α-(2'-furyl)-7α,8α-methyleneestra-1,3,5(10)-triene-3,17-diol, 17α-(2'-thienyl)-7α,8α-methyleneestra-1,3,5(10)-triene-3,17-diol, 17α-(3'-furyl)-7α,8α-methyleneestra-1,3,5(10)-triene-3,17-diol, 17α-methyl-7α,8α-methyleneestra-1,3,5(10)-triene-3,17-diol, 17α-ethyl-7α,8α-methyleneestra-1,3,5(10)-triene-3,17-diol, 17α-vinyl-7α,8α-methyleneestra-1,3,5(10)-triene-3,17-diol, and 17α-ethynyl-7α,8α-methyleneestra-1,3,5(10)-triene-3,17-diol are obtained.

EXAMPLE 15

3,17 - diacylates of 17α-substituted-7α,8α-methyleneestra-1,3,5(10)-triene-3,17-diols A solution of 17α-(3'-furyl) - 7α,8α - methyleneestra-1,3,5(10)-triene-3,17-diol (6.32 g.), in pyridine (63 ml.), and acetic anhydride (63 ml.), is heated on the steam bath for 24 hours. The reaction product is isolated as in Example 14. The crude solid residue is chromatographed on alumina to yield 3,17-diacetoxy - 17α - (3'-furyl)-7α,8α-methyleneestra-1,3,5(10)-triene.

By substituting in the above procedure acetic anhydride by propionic or butyric anhydride 3,17 - dipropionyloxy-17α-(3'-furyl) - 7α,8α - methyleneestra-1,3,5(10)-triene and 3,17β - dibutanolyloxy-17α-(3'-furyl)-7α,8α-methyleneestra-1,3,5(10)-triene are obtained.

Similarly, acylation with acetic, propionic, or butyric anhydrides in pyridine solutions at 100° C. for 24 hours of the other 17α-substituted -7α,8α-methyleneestra-1,3,5(10)- triene-3,17-diols, yields respectively the 3,17-diacetates, 3,17-dipropionates, or 3,17-dibutyrates of:

17α-(2'-furyl)-7α,8α-methyleneestra-1,3,5(10)-triene-3,17-diol,
17α-(2'-thienyl)-7α,8α-methyleneestra-1,3,5(10)-triene-3,17-diol,
17α-(3'-thienyl)-7α,8α-methyleneestra-1,3,5(10)-triene-3,17-diol,
17α-methyl-7α,8α-methyleneestra-1,3,5(10)-triene-3,17-diol,
17α-ethyl-7α,8α-methyleneestra-1,3,5(10)-triene-3,17-diol,
17α-vinyl-7α,8α-methyleneestra-1,3,5(10)-triene-3,17-diol, and
17α-ethynyl-7α,8α-methyleneestra-1,3,5(10)-triene-3,17-diol.

EXAMPLE 16

17 - acylates of 17α-substituted - 7α,8α - methyleneestra-1,3,5(10)-triene-3,17-diols A mixture of 3,17-diacetoxy - 17α - (3'-furyl)-7α,8α-methyleneestra-1,3,5(10)-triene (500 mg.), obtained as described in Example 15, in potassium carbonate (500 mg.), methanol (75 ml.), and water (1.2 ml.), is stirred at room temperature for 1 hour. Water (200 ml.), is added and the mixture is evaporated partially under reduced pressure. The resulting solid is filtered, well washed with water and dried. Crystallization of this solid with methylene chloride-ether gives 17β-acetoxy-17-(3'-furyl)-7α,8α-methyleneestra-1,3,5(10)-trien-3-ol.

Similarly, hydrolysis of the other 3,17-diacetates of the 17α-substituted - 7α,8α - methyleneestra-1,3,5(10)-triene-3,17-diols, obtained in Example 15 gives respectively:

17β-acetoxy-17-(2'-furyl)-7α,8α-methyleneestra-1,3,5(10)-trien-3-ol,
17-β-acetoxy-17-(2'-thienyl)-7α,8α-methyleneestra-1,3,5(10)-trien-3-ol,
17β-acetoxy-17-(3'-thienyl)-7α,8α-methyleneestra-1,3,5(10)-trien-3-ol,
17β-acetoxy-17-methyl-7α,8α-methyleneestra-1,3,5(10)-trien-3-ol,
17β-acetoxy-17-ethyl-7α,8α-methyleneestra-1,3,5(10)-trien-3-ol,
17β-acetory-17-vinyl-7α,8α-methyleneestra-1,3,5(10)-trien-3-ol, and
17β-acetoxy-17-ethynyl-7α,8α-methyleneestra-1,3,5(10)-trien-3-ol.

EXAMPLE 17

3 - sulfates of 17α-substituted - 7α,8α - methyleneestra-1,3,5(10)-triene-3,17-diols Chlorosulfonic acid (0.142 ml.), is added cautiously to ice-cold pyridine (1 ml.), followed by a solution of 17β-acetoxy-17-(3'-furyl) - 7α,8α - methyleneestra-1,3,5(10)-trien-3-ol (200 mg.), obtained as described in Example 16, in pyridine (2.6 ml.). The mixture is heated on a steam bath for 5 minutes following the complete dissolution of the solid. After cooling, water (30 ml.) is added, and the pH of the solution is adjusted to 6.5. A solution of quinidine sulfate (227 mg.), in water (25 ml.), is added slowly with stirring. The steroidal quinidine sulfate slowly precipitates. It is filtered, washed with water, and dried. To a solution of this salt (320 mg.), in methanol (2 ml.), a 10% methanolic solution of sodium hydroxide (0.23 ml.) is added. The liberated quinidine crystallizes. It is filtered, and washed well with a small volume of methanol. Addition of ether to the filtrate yields 17β-acetoxy-17-(3'-furyl) - 7α,8α - methyleneestra - 1,3,5(10)-trien-3-ol, 3-sodium sulfate, as an amorphous solid.

A solution of the above mentioned sodium sulfate (113 mg.), in 10% aqueous methanol (4.5 ml.), is refluxed for 20 minutes with sodium hydroxide (226 mg.). The cold solution is diluted with water (22.6 ml.) and the pH is adjusted to 6.5 by the addition of acetic acid. A solution of quinidine sulfate (102 mg.) in water (10.1 ml.) is added. The steroidal quinidine sulfate precipitates, It is filtered, well washed with water, and dried. The infrared spectrum of this salt shows the complete hydrolysis of the 17-acetate group. The steroidal quinidine salt is transformed as above, by treatment with methanolic sodium hydroxide, to 17α-(3'-furyl)-7α,8α-methyleneestra-1,3,5(10)-triene-3,17-diol 3-sodium sulfate.

By a similar procedure the 17-acetates of the other 17α-substituted -7α,8α-methyleneestra - 1,3,5(10) - triene-3,17-diols obtained as described in Example 16 are transformed into the 3-sodium sulfates of 17α-(2'-furyl)-7α,8α-methyleneestra-1,3,5(10)-triene-3,17-diol,
17α-(2'-thienyl-7α,8α-methyleneestra-1,3,5(10)-triene-3,17-diol,
17α-(3'-thienyl)-7α,8α-methyleneestra-1,3,5(10)-triene-3,17-diol,
17α-methyl-7α,8α-methyleneestra-1,3,5(10)-triene-3,17-diol,
17α-ethyl-7α,8α-methyleneestra-1,3,5(10)-triene-3,17-diol,
17α-vinyl-7α,8α-methyleneestra-1,3,5(10)-triene-3,17-diol, and
17α-ethynyl-7α,8α-methyleneestra-1,3,5(10)-triene-3,17-diol.

I claim:

1. A compound selected from those of the formula

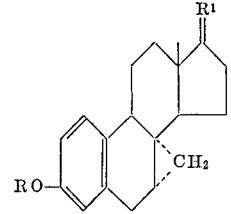

wherein R is selected from hydrogen, lower alkyl, cyclopentyl, 2-tetrahydropyranyl and lower aliphatic acyl containing from 2 to 4 carbon atoms; and $R^1$ is selected from ketonic oxygen and the group

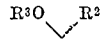

in which $R^2$ represents hydrogen, lower alkyl containing from 1 to 4 carbon atoms, lower alkenyl containing from 2 to 4 carbon atoms, lower alkynyl containing from to 4 carbon atoms, 2-furyl, 3-furyl and 2-thienyl; and $R^3$ is selected from hydrogen and lower aliphatic acyl containing from 2 to 4 carbon atoms.

2. 7α,8α-methyleneestra-1,3,5(10)-triene-3,17β-diol, as claimed in claim 1.

3. 7α,8α-methyleneestra-1,3,5(10)-triene-3,17β-diol diacetate, as claimed in claim 1.

4. 3-methoxy - 7α,8α - methyleneestra-1,3,5(10)-trien-17β-ol, as claimed in claim 1.

5. 3-hydroxy-7α,8α-methyleneestra - 1,3,5(10) - trien-17-one, as claimed in claim 1.

6. 17α - ethynyl-7α,8α-methyleneestra-1,3,5(10)-triene-3,17-diol, as claimed in claim 1.

7. 7α,8α-methylene - 17α - vinylestra-1,3,5(10)-triene-3,17-diol, as claimed in claim 1.

8. 3-methoxy - 7α,8α - methyleneestra-1,3,5(10)trien-17-one, as claimed in claim 1.

9. 3-(2 - tetrahydropyranyloxy)-7α,8α-methyleneestra-1,3,5(10)-trien-17-one, as claimed in claim 1.

10. 17α(2'-furyl) - 7α,8α - methyleneestra - 1,3,5(10)-triene-3,17-diol, as claimed in claim 1.

11. The process which comprises bringing together, in a hydrocarbon solvent and at a temperature within the range 25° C. to 140° C., triethylaluminum, methylene iodide and a steroid compound selected from the group which consists of equilin and 17β-dihydroequilin, thereby obtaining 7α,8α - methyleneestra - 1,3,5(10)-triene-3,17β-diol.

12. The process as defined in claim 11 wherein the hydrocarbon solvent is selected from the group which consists of hexane, cyclohexane, benzene, toluene and xylene.

13. The process of preparing 7α,8α-methyleneestra-1,3-5(10)-triene-3,17β-diol as defined in claim 11, which comprises treating equilin in solution in a hydrocarbon solvent with triethylaluminum and methylene iodide at a temperature within the range 25° C. to 140° C.

14. The process of preparing 7α-8α-methyleneestra-1,3,5(10)-triene-3,17β-diol as defined in claim 11, which comprises treating 17β-dihydroequilin in solution in a hydrocarbon solvent with triethylaluminum and methylene iodide at a temperature within the range 25° C. to 140° C.

No references cited.

ELBERT L. ROBERTS, Primary Examiner

U.S. Cl. X.R.
260—397.4, 397.5

PO-1050
(5/69)

UNITED STATES PATENT OFFICE
CERTIFICATE OF CORRECTION

Patent No. 3,634,404          Dated January 11, 1972

Inventor(s) David J. Marshall

It is certified that error appears in the above-identified patent and that said Letters Patent are hereby corrected as shown below:

Claim 1, Column 12, lines 51 to 52 should read

--lower alkynyl containing from 2 to 4 carbon atoms--

Signed and sealed this 20th day of June 1972.

(SEAL)
Attest:

EDWARD M. FLETCHER, JR.      ROBERT GOTTSCHALK
Attesting Officer             Commissioner of Patents